(12) United States Patent
Rinne et al.

(10) Patent No.: US 10,448,308 B2
(45) Date of Patent: Oct. 15, 2019

(54) MULTIPATH INTERFACES IN NEW SCENARIOS

(71) Applicant: NOKIA TECHNOLOGIES OY, Espoo (FI)

(72) Inventors: Mika Rinne, Espoo (FI); Sami Johannes Kekki, Helsinki (FI); Markus Isomäki, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 14/638,545

(22) Filed: Mar. 4, 2015

(65) Prior Publication Data
US 2016/0262080 A1 Sep. 8, 2016

(51) Int. Cl.
| | | |
|---|---|---|
| *H04W 28/02* | (2009.01) | |
| *H04W 92/02* | (2009.01) | |
| *H04W 72/08* | (2009.01) | |
| *H04W 40/02* | (2009.01) | |
| *H04W 76/16* | (2018.01) | |
| *H04W 88/06* | (2009.01) | |
| *H04W 28/08* | (2009.01) | |
| *H04L 12/707* | (2013.01) | |

(52) U.S. Cl.
CPC .......... *H04W 40/02* (2013.01); *H04W 76/16* (2018.02); *H04L 45/24* (2013.01); *H04W 28/08* (2013.01); *H04W 88/06* (2013.01)

(58) Field of Classification Search
CPC .......................... H04W 72/085; H04W 92/082
USPC ................................................ 455/436, 445
See application file for complete search history.

(56) References Cited

U.S. PATENT DOCUMENTS

| | | | |
|---|---|---|---|
| 2013/0064198 A1 | 3/2013 | Krishnaswamy et al. | |
| 2014/0329526 A1* | 11/2014 | Sundararajan | H04W 36/00 455/436 |
| 2015/0181459 A1* | 6/2015 | Zhu | H04W 28/0268 370/236 |

FOREIGN PATENT DOCUMENTS

| | | | |
|---|---|---|---|
| EP | 2 704 481 A1 | | 3/2014 |
| WO | WO 2013/061115 A1 | * | 5/2013 |
| WO | 2014/170541 A1 | | 10/2014 |

OTHER PUBLICATIONS

A. Ford et al., "TCP Extensions for Multipath Operation with Multiple Addresses", Request for Comments: 6824, ISSN: 2070-1721, Jan. 2013.
R. Winter et al., "Multipath TCP Support for Single-Homed End-Systems", Internet Engineering Task Force, NEC Laboratories Europe, Jul. 15, 2013.
T. Melia et al., "Logical Interface Support for Multi-Mode IP Hosts", NETEXT WG, Sep. 3, 2014.
European Search Report for corresponding EP application No. 16158594.8 dated Jul. 25, 2016.

(Continued)

*Primary Examiner* — Gary Lafontant
(74) *Attorney, Agent, or Firm* — Squire Patton Boggs (US) LLP

(57) ABSTRACT

Systems, methods, apparatuses, and computer program products for multipath interfaces are provided. One method includes establishing, by a user equipment, multiple network interfaces for multipath transmissions, wherein the multiple interfaces comprise a first radio interface and a second radio interface. The method also includes receiving a request from an access-path network to keep flows of the first radio interface and the second radio interface separate.

22 Claims, 12 Drawing Sheets

(56) References Cited

OTHER PUBLICATIONS

R2-152109; Nokia Networks, "Traffic Steering Command for Rel-13 WLAN Interworking", WGPP TSG-RAN WG2 Meeting #90. pp. 1-3, Fukuoka, Japan, May 25-29, 2015.
Qimei et al., "A Unified Protocol Stack Solution for LTE and WLAN in Future Mobile Converged Networks". IEEE Wireless Communications, Dec. 2014. pp. 24-33.
S2-134121; Motorola Mobility, "Co-existence of ANDSF-based and RAN-based Traffic Steering". SA WG2 Meeting #100, pp. 1-6. San Francisco, USA. Nov. 11-15, 2013.
Ford et al., "Architectural Guidelines for Multipath TCP Development". Internet Engineering Task Force (IETF). Request for Comments, Informational Memo, ISSN: 2070-1721. pp. 1-28. Mar. 2011.
3GPP TR 37.834 V12.0.0 (Dec. 2013). Technical Specification, 3rd Generation Partnership Project; Technical Specification Group Radio Access Network; Study on Wireless Local Area Network (WLAN), 3 GPP Radio Interworking (Release 12). pp. 1-17, Dec. 2013.
European Office Action dated May 3, 2017, issued in corresponding EP Application No. 16158594.8.
Communication pursuant to Article 94(3) EPC dated Jan. 23, 2018 corresponding to European Patent Application No. 16158594.8.

\* cited by examiner

MULTIPATH INTERFACES IN NEW SCENARIOS

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), future 5G radio access technology, and/or High Speed Packet Access (HSPA). In particular, some embodiments may relate to the creation of multiple interfaces for so-called multipath transmissions.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided in the enhanced Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN provides a new radio access technology and refers to the improvements of UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while keeping the backward compatibility. One of the key features of LTE-A, introduced in LTE Rel-10, is carrier aggregation, which allows for increasing the data rates through aggregation of two or more LTE carriers, e.g., to the transmission bandwidth of up to 100 MHz. LTE-A in later releases may include even wider bandwidths as specified so far. Further, aggregating or interworking on the radio access level with the wireless LAN (WLAN) access network is foreseen.

SUMMARY

One embodiment is directed to a method which may include establishing, by a user equipment, multiple network interfaces for multipath transmissions. The multiple interfaces may comprise a first radio interface and a second radio interface. The method may also include receiving a request from an access-path network to keep flows of the first radio interface and the second radio interface separate.

Another embodiment is directed to an apparatus that may include at least one processor, and at least one memory including computer program code. The at least one memory and the computer program code may be configured, with the at least one processor, to cause the apparatus at least to establish multiple network interfaces for multipath transmissions. The multiple interfaces may comprise a first radio interface and a second radio interface. The at least one memory and the computer program code may be further configured, with the at least one processor, to cause the apparatus at least to receive a request from an access-path network to keep flows of the first radio interface and the second radio interface separate.

Another embodiment is directed to a computer program, embodied on a non-transitory computer readable medium. The computer program may be configured to control a processor to perform a process, which may include establishing multiple network interfaces for multipath transmissions. The multiple interfaces may comprise a first radio interface and a second radio interface. The process may also include receiving a request from an access-path network to keep flows of the first radio interface and the second radio interface separate.

Another embodiment is directed to a method which may include transmitting a request to a user equipment to keep flows of a first radio interface and a second radio interface separate. The method may also include receiving a response from the user equipment of whether or not the second radio interface can be opened.

Another embodiment is directed to an apparatus that may include at least one processor, and at least one memory including computer program code. The at least one memory and the computer program code may be configured, with the at least one processor, to cause the apparatus at least to transmit a request to a user equipment to keep flows of a first radio interface and a second radio interface separate. The at least one memory and the computer program code may be further configured, with the at least one processor, to cause the apparatus at least to receive a response from the user equipment of whether or not the second radio interface can be opened.

Another embodiment is directed to a computer program, embodied on a non-transitory computer readable medium. The computer program may be configured to control a processor to perform a process, which may include transmitting a request to a user equipment to keep flows of a first radio interface and a second radio interface separate. The process may also include receiving a response from the user equipment of whether or not the second radio interface can be opened.

BRIEF DESCRIPTION OF THE DRAWINGS

For proper understanding of the invention, reference should be made to the accompanying drawings, wherein.

DETAILED DESCRIPTION

Figure 1:
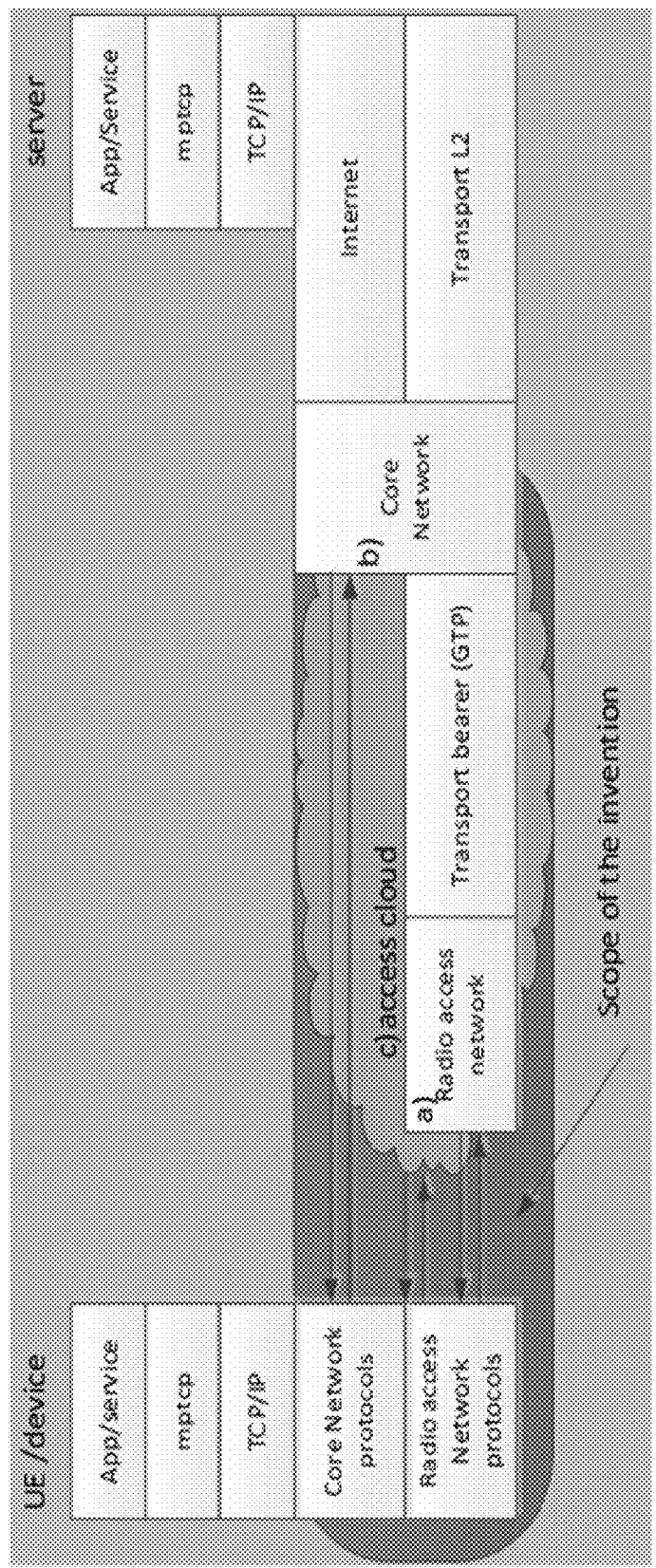
FIG. 1 illustrates an example block diagram depicting the signalling between the UE and the radio access network, core network, or an access cloud, according to an embodiment.

It will be readily understood that the components of the invention, as generally described and illustrated in the figures herein, may be arranged and designed in a wide variety of different configurations. Thus, the following detailed description of embodiments of systems, methods, apparatuses, and computer program products for multipath interfaces, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Certain embodiments of the invention relate to devices/clients (e.g., UEs) capable of opening multiple interfaces for multipath transmissions. Multipath transmissions are beneficial for the needs of ultra-reliable transport between the source and destination, or for throughput benefits by splitting transport to multiple paths. The sum throughput can be increased by multipath delivery or by reducing the impact of packet drops (due to uncorrelated errors) on different paths or by reducing the impact of congestion on transmission paths.

Some special use cases for multipath transmissions may include small cell deployments and machine-type communications, for example.

Recent studies and specifications in 3GPP have resulted in definitions of small cell deployments, where many new issues related to the mobility procedures and robustness occur. Small cell communications may cause more signalling due to cell changes and mobility. In small cell scenarios, cell changes can cause delays of data delivery or short service interrupts or cell change ping-pong effects. Further, in small cell scenarios, cell changes may require considerable amount of measurements, measurement reports and signalling procedures between the UE and the network, because the event triggers tend to be frequently met. This is due to the number of objects to measure (MeasObject) and due to the event dynamics.

Multipath operation, according to certain embodiments, would allow a UE to open separate interfaces for use in different cells. If the UE can successfully get resources from multiple cells, the UE can exploit multiple interfaces concurrently. If one interface momentarily cannot be served, the UE can seamlessly continue using the other interface. The multipath operation, while it sometimes has the first interface serving and other times the second interface serving, causes no problems to the connection management, while the application continues to be served from any of its interfaces. In this manner, multipath operation could partly replace the need of local mobility procedures, while the UE can hang on in many cells (of different network interfaces) simultaneously and gets resources allocated where appropriate. A longer time in-activity via an interface may make the UE close that non-serving interface. Alternatively, the UE may keep that (non-used) interface alive, just to have it available as a backup, in case the primarily serving interface becomes congested, or not available.

With respect to machine-type communications, machines may face special needs to obtain reliable (or ultra-reliable) communications, or obtain communications via any of their multitude of radios at a given time. For these purposes, a machine-type UE could open several interfaces and let them be probed for service quality and throughput, jointly serving an application. For example, at certain times it may have interface 1 responding and at other times have interface 2 responding, and sometimes have both interfaces responding, thereby seamlessly allowing the machine-type application to be served accordingly.

The cellular systems up and including the 4G LTE/LTE-A have been specified to support network based mobility for the traffic flows of the UEs. This mobility support is one of the key aspects of the cellular systems and one of the key functionality offered through the protocols of the system. The support for the network based mobility also is one of the root causes for any control plane congestion in the system; in any such circumstances where a larger population of active UEs needs to move from one access to another, there is risk for congestion in the control plane. By utilizing the multipath transmission capability of the client, it can be possible for the system to significantly reduce the amount of mobility signaling for active UEs. With multipath transmission the switching of the traffic from one access to another, or from one cell to another (i.e., traditional mobility events) is no longer such a critical procedure due to the implicit path redundancy from the multipath transmission.

It is noted that having the flow mobility in use in the access network and using multipath protocol on top of that has the problem that they may not execute well concurrently, due to their fundamentally different set of objectives. Flow mobility tends to move flows according to a criterion from one access to another, depending on which access is expected to be most suitable for the flow, at a time. Multipath tries to keep flows on separate access paths concurrently, and let the multipath protocol to decide how aggressively to load segments of a flow to each access path.

In network based IP mobility mechanisms, such as Proxy Mobile IP (PMIP) or GPRS tunneling protocol (GTP), the network can allocate the device the same IPv4 address or IPv6 prefix over multiple points of network attachment. This makes it more difficult for the upper layers to be aware of the underlying interfaces.

A problem is opening multipath transmission for a 3GPP connection and/or 3GPP and wireless local area network (WLAN) connections having the same IP (IPv4) address or the same IP (IPv6) prefix. Without opening multiple paths in this case, the data packets get transmitted via different radio accesses by the resource decisions and by the experienced load, without the knowledge of flow handling. This may cause serious performance problems, for instance, for transport control protocol (TCP) which sees packet losses on the WLAN radio access and delays of 3GPP access impacting the end-to-end TCP protocol run over the 3GPP access and/or over the WLAN access momentarily. Combining path properties of 3GPP access and WLAN access for the same flow of a conventional TCP is not favorable. Opening multiple interfaces which create different flows for a multipath protocol does not suffer from the consequences of a conventional TCP, but on the contrary may benefit from multiple transmission paths.

Thus, new coordinated approaches are needed to use multipath transport efficiently. With any network based mobility of today, the network guides how to move flows from one access to another. With Network Based IP Flow Mobility (NB-IFOM) it is feasible to have the same packet data network (PDN) connection active in both accesses and switch flows between the two.

An additional problem is that there may be a lack of knowledge to apply multipath protocol in a situation, where it could provide a solution to the network performance problems. The connection manager of the device may not recognize when and how to try multipath transport for the performance problems being experienced in the network.

Certain embodiments are directed to signalling between the access-path network and the UE connection manager to trigger the use of multipath protocol between the client and the server. Some embodiments include signalling means for keeping the multipath flows mapped to different access paths. Embodiments described herein provide several alternative architectures of 3GPP access network and WLAN access network integration. Embodiments may work equally in the multi-homed case and in the single-homed case, the homing of which may depend on the 3GPP and WLAN integration architecture.

Previously, the flow mobility would tend to map the traffic flows according to their flow types (e.g., IP 4-tuple or 5-tuple) to the selected radio access. This will lead to the situation that the flows of the multipath connection may end-up being routed via the same access path, which causes the multipath benefits being lost.

Embodiments of the invention prevent the multipath flows being mapped to the same interface by an explicit request, for example, "to keep the flows separate despite of their flow routing rules". Embodiments enable the flow to be served via multiple interfaces and allow the decision making on how to load the interfaces happen by the multipath protocol. The multipath protocol as such can evaluate the round-trip-time and successfully deliver segments over different paths and load the network interfaces (subpaths) accordingly. If one of the interfaces performs worse, it will be used for less data and less segments will be delivered via that interface; whereas the other interface may deliver more and more of the segments. Switching from one interface to another interface does not require any flow mobility event (i.e., flow switching), because the interfaces are concurrently in use by the multipath protocol. In this case, requesting the prevention of flow steering is reasonable, because the performance is at every moment dominated by the better path and flow switching is inherent by the segments delivered over the (two) interfaces and acknowledged by the remote end of the multipath protocol.

Certain embodiments provide a method for the access-path network to request by signalling the device to open multiple interfaces. The network may initiate the request on its own, for a reason originating from the network topology, or from a local problem in the network performance. The network may also originate the request for its intended use for the mobility solution. The request by the network is especially motivated in situations, where the device could not recognize the problem itself or the device could not recognize that opening multiple interfaces and running a multipath protocol would provide a feasible improvement.

According to an embodiment of the invention, the network has information about its architectural topology and performance (e.g., KPI statistics), which is a useful trigger in requesting the multipath (a trigger that the UE may otherwise not have). KPI refers to a key performance indicator or a set of key performance indicators of the network, which may include such measures as quality, delay, mobility performance, energy efficiency, used amount of resources, achieved capacity, throughput, coverage or their statistical metrics; as an example handover failure rate, radio link failure probability, or the like. KPI is typically monitored and controlled in the network by the network vendor or the operator, or automated operational units or optimization and management units in the network.

Performance issues (i.e., KPI) detected by the access-path network may be specific to certain location or to a certain configuration of the network. Having multiple interfaces in use may significantly alleviate or completely remove these problems. Without the access-path network request, it may remain un-recognizable to the UE that in particular this location, in this network setting, with these problems, the establishment of multiple interfaces into use will solve the problems.

Also, the UE capable of using multiple interfaces for multipathing may need to execute a trial-and-error process to try sub-path establishment with the server to find out, whether multipath connection is feasible. It would save the UE the effort, if it gets information from the access-path network, whether the use of multiple interfaces in a multi-path configuration will likely be successful or not. The access-path network may readily know that in this architecture with these flow mobility algorithms, the multipath trial will fail, or the access-path network may readily know that in this network architecture, the multipath is supported. If the network does not give a definite request, the UE may try the subpath establishment with the server "blindly".

Yet, certain embodiments may have some savings in knowing (by the access-path network) beforehand that multipath will surely not work (for a reason) or it will work (for a reason) despite whether the server supports it or not. One example reason why multipath may not work, could be a network based flow routing policy. One example reason why a multipath would always work, could be a flow routing policy that explicitly allows multipath flows and having the access-path network configured with an ON-PATH proxy, e.g., as a function in the PDN gateway. The ON-PATH proxy allows multipath flows be terminated already in the access-path network without breaking the flows and without needing the multipath-capability in the server. This way, the access-path network can readily promise the success of multipath (without a functionality in the application server), if the device just decides to initiate it.

Certain embodiments may work with different integration solutions between the 3GPP access and the WLAN access. The integration may be any of: 1) non-integrated WLAN network, 2) integration of partner (untrusted) WLAN via the enhanced/evolved packet data gateway (ePDG), 3) integration of trusted WLAN to the 3GPP core network (e.g., via s2a, s2b or s2c), or 4) integration of WLAN to the 3GPP network in the RAN. A non-integrated WLAN is any WLAN network that is not part of the 3GPP architecture. This kind of WLAN network may be known in WLAN flow mobility policies at least in the level of its network identities, and possibly also of its service provider or consortium organization identities.

The integration of WLAN network to the 3GPP core network may happen with or without the ePDG depending on whether the WLAN access network is logically or physically connected to the core network.

The RAN integration according to alternative 4 may be implemented in: 1) tight-integration manner, or in 2) loose-integration manner. Tight integration requires procedures similar to handover with its measurements and event reports between the WLAN access network, e.g., the access network controller or the WLAN access points and the 3GPP eNB, whereas the loose-integration requires 3GPP RAN assistance in UE's access selection. For these alternatives in the access-path network, the invention covers the signalling procedure with the a) radio access network, b) with the core network (or a server therein) or more abstractly with the access cloud. All these signalling procedures may be on lower layers of the connection management (between the UE device and the access-path network) and they do not interfere with the multipath protocol and algorithms acting between the UE client and the server, on higher protocol layers.

FIG. 1 illustrates an example block diagram depicting the signalling between the UE and the a) radio access network, b) core network (or server therein), or c) an access cloud to benefit in multipath operations between the UE and the server over the access-path network. It should be noted that the term "access-path network" may commonly be used herein to cover the alternatives a), b) and c), possibly with additionally including the WLAN access network therein.

Figure 2:
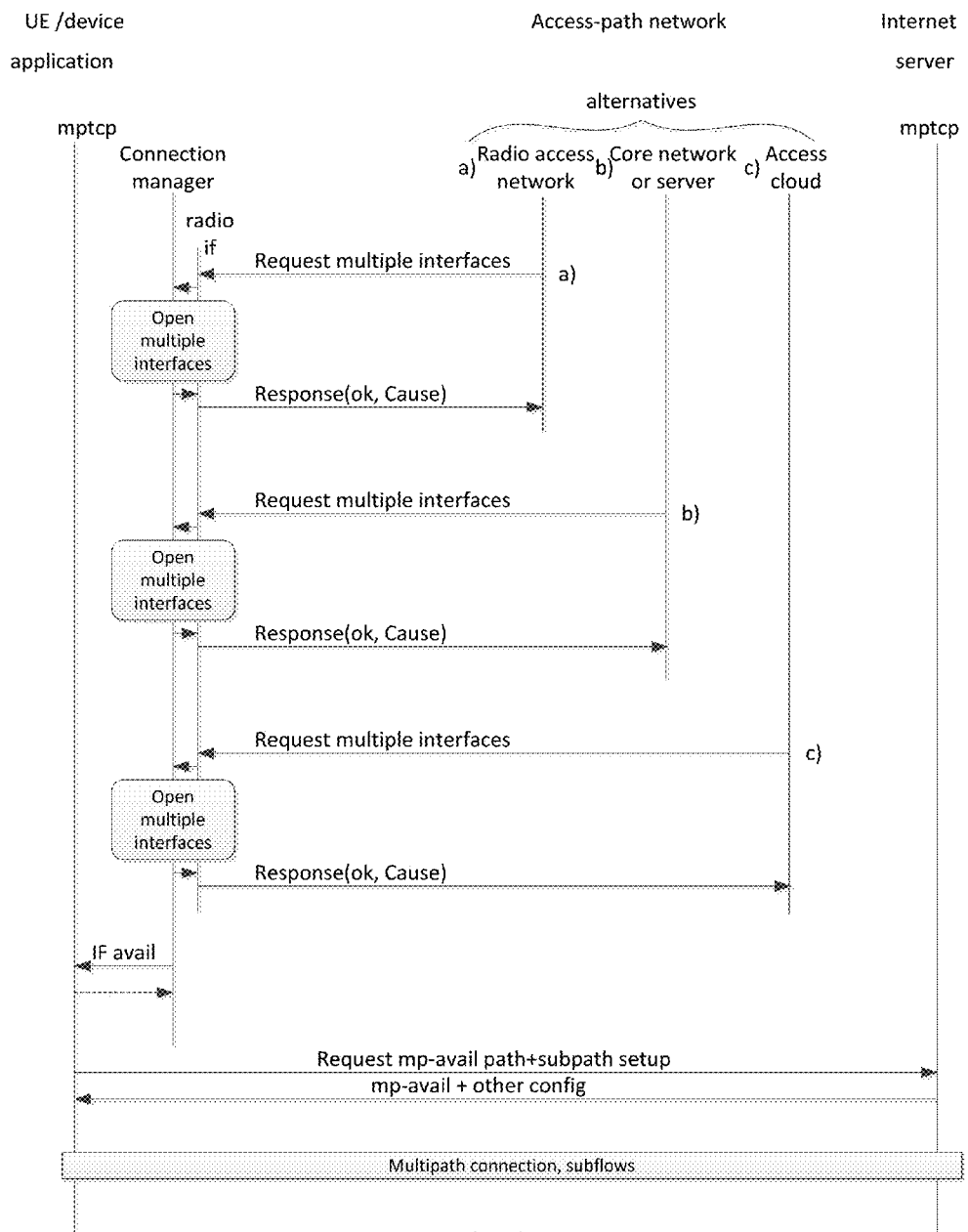
FIG. 2 illustrates examples of the signalling alternatives for the access-path network to request for the UE to open multiple interfaces, according to an embodiment.

According to an embodiment of the invention, the serving network originates the request for a UE to open multiple interfaces. FIG. 2 illustrates examples of the signalling alternatives for the access-path network to request for the UE to open multiple interfaces. As illustrated in FIG. 2, the request may be originated from a) the radio access network, b) the core network or c) the access cloud. If the network offers the UE multiple interfaces, it may do this by allocating multiple IP addresses/prefixes to the UE.

Figure 3:
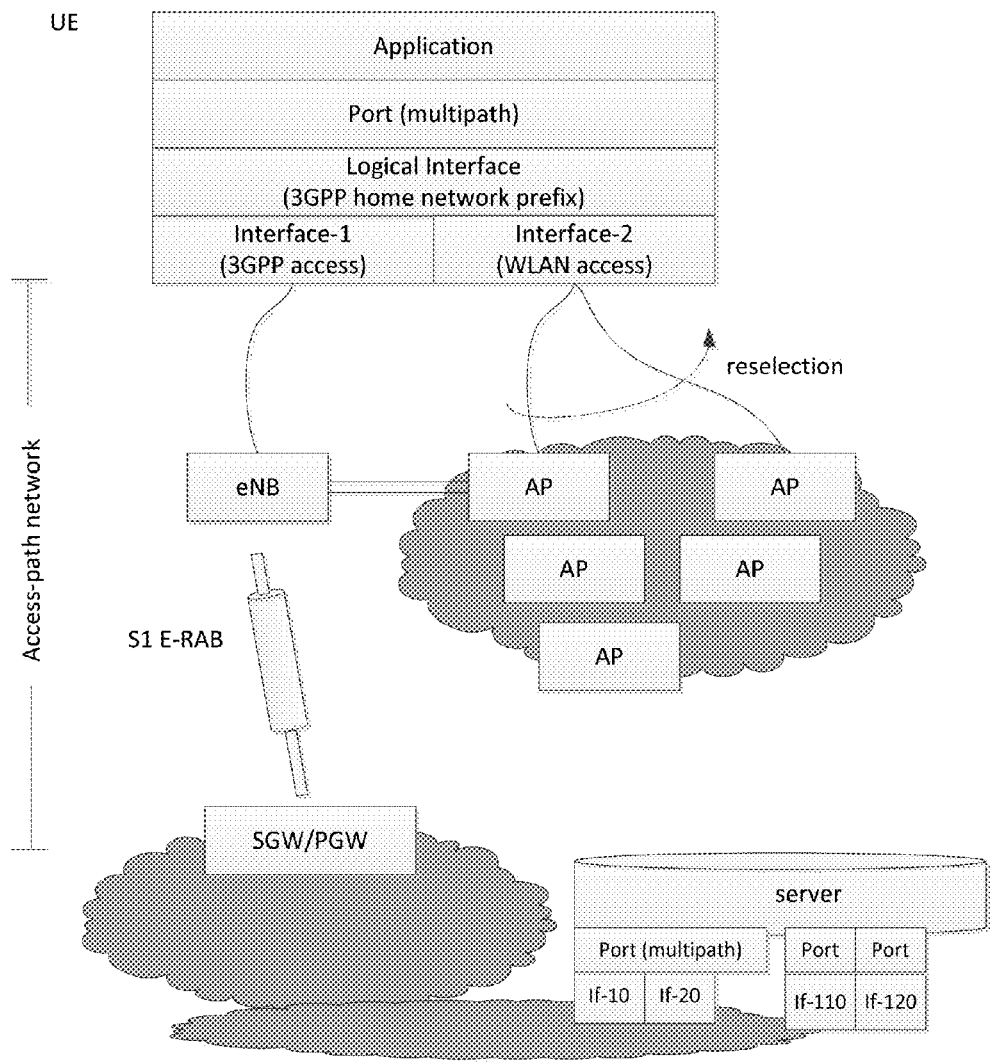
FIG. 3 illustrates the use of multiple interfaces in a single-homed network, according to an embodiment.

However, it is also feasible to offer the UE interfaces having single IP address/prefix, as illustrated in FIG. 3. In particular, FIG. 3 illustrates the use of multiple interfaces in a single-homed network, when the networks are integrated in the RAN, according to the integration alternative 4. The opening of interfaces in this case happens in another abstraction than IP. The network may take care that the traffic flows of a UE get directed to different transport paths inside the "access-path network" by other than IP addressing mechanisms, such as by port numbers, flow labels or access network identifiers. Some exemplary implementations are described below.

The signalling may be described by the following:
Request_to_UE {
 open a second interface
 configure (select: multi-homed, single-homed)
  {use UE IP address 1 and UE IP address 2 for multipath}
  {use UE_IP address 1 for both interfaces}
 Purpose (select: multipath, offload)
 Additional info: (select: use multipath and omit flow mobility policy, use flow mobility)
}
Response_to NW {
 Second interface configured ACK
 Additional info (select: multipath successful, use flow mobility)
}
Response_to_NW {
 Fail (Cause: no multipath capability; no capability to run two interfaces; user preference: not to use two interfaces)
}

An embodiment of having single-homed interfaces is to apply dual connectivity of radio interfaces so that different bearers or different bearer types are in use for the two interfaces. As an example, there may be a Master Cell Group bearer in use with the first eNB interface and a Second Cell Group bearer in use for the second eNB interface. Another example is to have 3GPP bearer in use for the first interface and WLAN bearer in use for the second interface.

Figure 4:
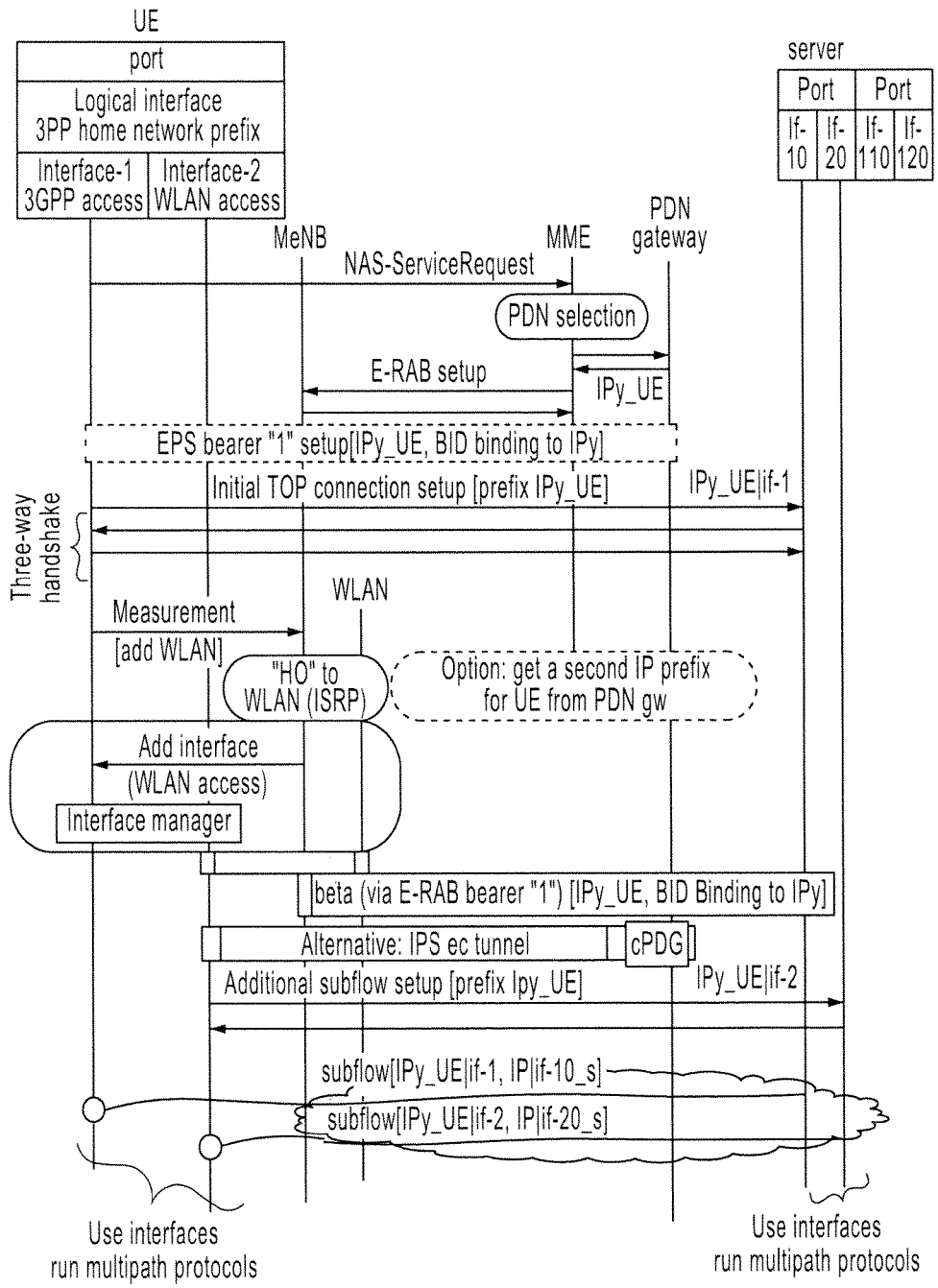
FIG. 4 illustrates an example signaling diagram where the 3GPP radio access network requests the UE to open a WLAN interface for the concurrent use of the two interfaces, according to an embodiment.

FIG. 4 illustrates an example signaling diagram where the 3GPP radio access network requests the UE to open a WLAN interface for the concurrent use of the two interfaces, according to an embodiment. In an embodiment, the UE, when configured by policies, knows how to manage its network interfaces for different needs, such as for different applications, services, or different flow types. These policies may guide a UE to open single or multiple network interfaces.

According to an embodiment, in case the UE intends to open multiple interfaces, it can do so by searching networks and by requesting IP addresses via the found networks. The UE may have a single multipath port to be run over multiple IP interfaces and run, for example, multipath TCP protocol on top of the port. Alternatively, in an embodiment, the UE may open multiple interfaces, even if it does not request multiple IP addresses/prefixes. The device may open multiple interfaces, for example, by mapping different ports or port ranges to different network interfaces (e.g., mapping to different radio access networks). The UE may, for instance, assign certain port number ranges to be delivered via the first radio access network and certain other port number ranges via the second radio access network, according to the set policies of port number use.

In certain embodiments, the UE's usage of multiple interfaces may be implementation specific behavior, but it may also be guided by policies set by the user or by the application (e.g., at the time of installation) or policies set by the serving network. When the policies from the network guide the UE's use of interfaces, the policies may originate in different parts from the network, say from a cloud of networks, from the core network, from a server therein or from the radio access network, for example.

According to some embodiments, when a UE opens multiple interfaces, it can load the interfaces according to flow specific traffic definitions. The application may alternatively perform a higher layer loading of interfaces according to their experienced bandwidth-delay-product, for example according to throughput, delay or robustness targets. The application above HTTP may, for example, calculate data units delivered over the interfaces and may balance the sum throughput accordingly. Alternatively, the UE may run multipath protocol below the application, so that amounts of data get loaded to the interfaces according to the transport protocol and its algorithms. The transport port protocol may, for example, tune its aggressiveness to the acknowledgements received from the other end. The UE may take the initiative to propose use of multiple interfaces to the server and when the addition of transport subflows is successful, both the server and the device may run the multipath joint-protocol and joint-algorithms (e.g., according to 3GPP RFC6824). This may apply to both from the server-to-device traffic as well as from the device-to-server traffic.

Having multiple interfaces in use for the different port ranges needs a functionality which allows transferring a flow from one interface to another, in case the radio interface becomes less efficient (congested) or unavailable. According to an embodiment, this is easy to do and will not show as a service interrupt, because the other interface remains serving. In case a single port is opened for multiple interfaces, the application will not suffer from the traffic being momentarily mapped to either one of the interfaces or to both interfaces, as the socket defines. Therefore, compared to a conventional connection change (i.e., network based mobility, e.g., in 3GPP systems) from one access to another access, which requires fairly heavy signaling procedure and which may suffer from data losses or delays, flows can be more seamlessly handled by having multiple interfaces and by mapping the traffic to the interfaces as guided by the policy. The policy may be based on the traffic types (volume, delay, etc.), on the experienced performance of the interfaces or based on the availability and/or cost of the interfaces.

Figure 5A:
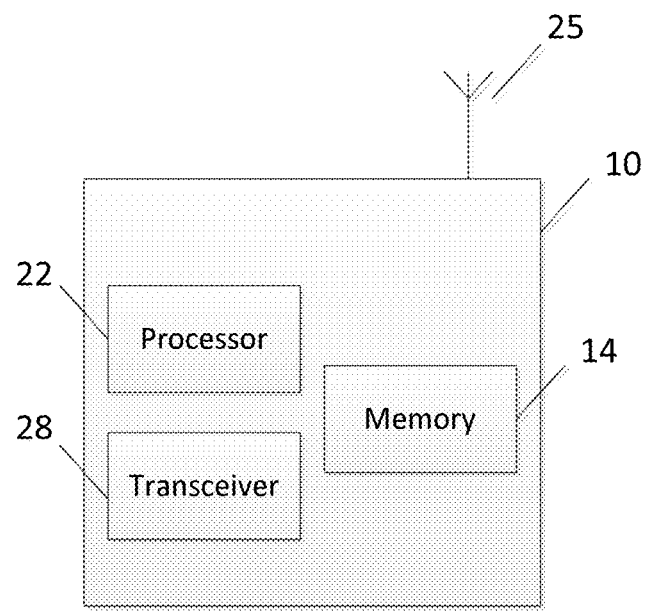
FIG. 5a illustrates an example block diagram of an apparatus, according to an embodiment.

FIG. 5a illustrates an example of an apparatus 10 according to an embodiment. In an embodiment, apparatus 10 may be a node, host, or server in a communications network or serving such a network. For example, in certain embodiments, apparatus 10 may be a network node or access node for a radio access network, such as a base station in UMTS or eNB in LTE or LTE-A. However, in other embodiments, apparatus 10 may be other components within a radio access network. It should be noted that one of ordinary skill in the art would understand that apparatus 10 may include components or features not shown in FIG. 5a.

As illustrated in FIG. 5a, apparatus 10 includes a processor 22 for processing information and executing instructions or operations. Processor 22 may be any type of general or specific purpose processor. While a single processor 22 is shown in FIG. 5a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a network node or access node, such as a base station in UMTS or an eNB in LTE or LTE-A, for example. Apparatus 10 may be controlled by memory 14 and processor 22 to transmit a request to a UE to keep flows of a first radio interface and a second radio interface separate. In response to the request, the UE may select flow routing rules of the first radio interface and the second radio interface. The UE may select or decide to ignore the flow routing rules of the first radio interface and the second radio interface. The UE may then transmit data using the first radio interface and the second radio interface regardless of the flow routing rules of the first and second radio interfaces.

In an embodiment, apparatus 10 may be further controlled by memory 14 and processor 22 to transmit a request to the UE to open the second radio interface. In other embodiments, the UE may decide on its own to open the second radio interface without receiving a specific request from the apparatus 10 to open the second radio interface. In yet another embodiment, the request to keep flows of a first radio interface and a second radio interface separate may also include a description of how and what kind of second radio interface should be opened. Apparatus 10 may then be further controlled by memory 14 and processor 22 to receive a response from the UE of whether or not the second radio interface can be opened. In some examples, the second radio interface "can be opened" may mean acting according to any of the embodiments of the invention.

In an embodiment, apparatus 10 may be further controlled by memory 14 and processor 22 to transmit a request to open the second radio interface. According to one embodiment, apparatus 10 may also be controlled by memory 14 and processor 22 to receive data using the first radio interface and the second radio interface when the response indicates that the second radio interface can be opened. In certain embodiments, when the response indicates that the second radio interface cannot be opened, apparatus 10 may also be controlled by memory 14 and processor 22 to receive data only using the first radio interface.

Figure 5B:
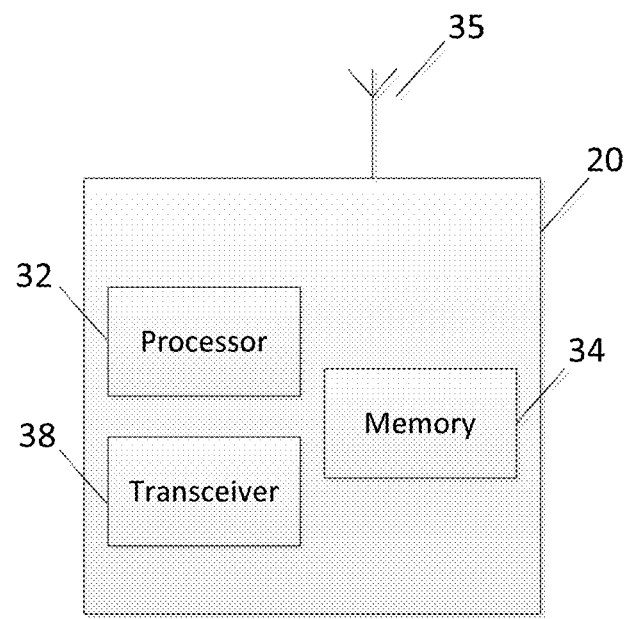
FIG. 5b illustrates an example block diagram of an apparatus, according to another embodiment.

FIG. 5b illustrates an example of an apparatus 20 according to another embodiment. In an embodiment, apparatus 20 may be a node or element in a communications network or associated with such a network, such as a UE, mobile device, mobile unit, a machine type UE or other device. For instance, in some embodiments, apparatus 20 may be UE in LTE or LTE-A. It should be noted that one of ordinary skill in the art would understand that apparatus 20 may include components or features not shown in FIG. 5b.

As illustrated in FIG. 5b, apparatus 20 includes a processor 32 for processing information and executing instructions or operations. Processor 32 may be any type of general or specific purpose processor. While a single processor 32 is shown in FIG. 5b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

In some embodiments, apparatus 20 may also include or be coupled to one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a mobile device, such as a UE in LTE or LTE-A. In this embodiment, apparatus 20 may be controlled by memory 34 and processor 32 to establish multiple network interfaces for multipath transmissions, where the multiple network interfaces comprise a first radio interface and a second radio interface. Apparatus 20 may also be controlled by memory 34 and processor 32 to receive a request from an access-path network to keep flows of the first radio interface and the second radio interface separate. The access-path network may include, for example, a cloud of networks, a core network, a server, and/or a radio access network.

In an embodiment, apparatus 20 may be controlled by memory 34 and processor 32 to ignore and/or select, in response to the request, flow routing rules of the first radio interface and the second radio interface, and to transmit data using the first radio interface and the second radio interface regardless of the flow routing rules of the first radio interface and the second radio interface.

According to some embodiments, apparatus 20 may be controlled by memory 34 and processor 32 to establish the multiple network interfaces by searching for networks and requesting internet protocol (IP) addresses via found networks, and to establish the multiple network interfaces by opening the multiple interfaces by mapping different ports or port ranges to different network interfaces.

According to one embodiment, apparatus 20 may also be controlled by memory 34 and processor 32 to receive a request from the access-path network to open the second radio interface, determine whether the second radio interface can be opened, and transmit a response to the access-path network depending on the determination. In an embodiment, apparatus 20 may be configured by policies that determine whether the user equipment establishes the multiple network interfaces or a single network interface. In some embodiments, apparatus 20 may be further controlled by memory 34 and processor 32 to transfer a flow from a less efficient one of the first radio interface or second radio interface to another one of the first radio interface or second radio interface.

Figure 6A:
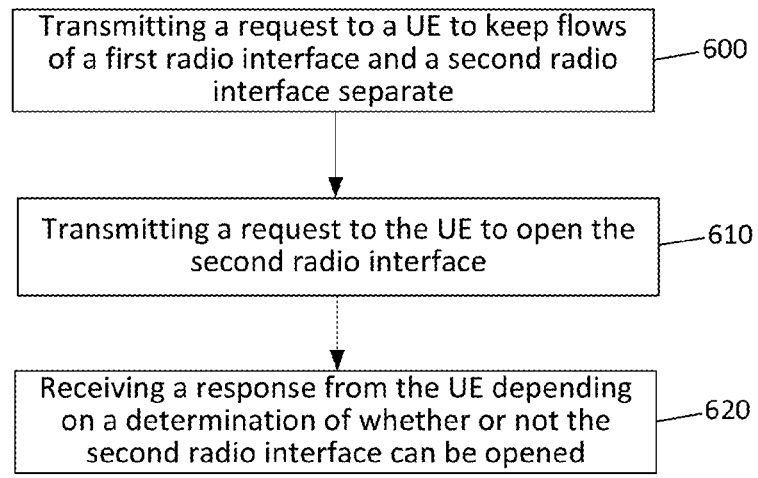
FIG. 6a illustrates an example flow diagram of a method for multipath transmission, according to an embodiment.

FIG. 6a illustrates an example flow diagram of a method for multipath transmission, according to an embodiment of the invention. In one example, the method of FIG. 6a may be performed by one or more nodes in an access-path network. As illustrated in FIG. 6a, the method may include, at 600, transmitting a request to a UE to keep flows of a first radio interface and a second radio interface separate. In response to the request, the UE may select flow routing rules of the first radio interface and the second radio interface. In response to the request, the UE may select or decide to ignore flow routing rules of the first radio interface and the second radio interface. The UE may then transmit data using the first radio interface and the second radio interface regardless of the flow routing rules of the first and second radio interfaces. In an embodiment, the method may also include, at 610, transmitting a request to the UE to open the second radio interface. In other embodiments, the UE may decide on its own to open the second radio interface without receiving a specific request from the network node to open the second radio interface. In yet another embodiment, the request to keep flows of a first radio interface and a second radio interface separate may also include a description of how and what kind of second radio interface should be opened. The method may also include, at 620, receiving a response from the UE depending on a determination of whether or not the second radio interface can be opened.

Figure 6B:
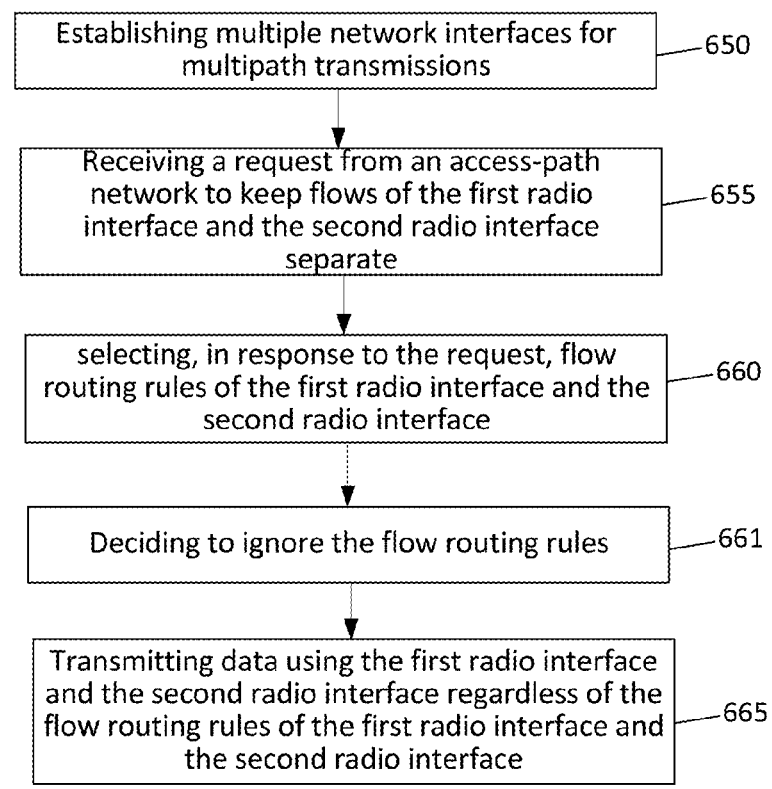
FIG. 6b illustrates an example flow diagram of a method for multipath transmission, according to another embodiment.

FIG. 6b illustrates an example flow diagram of a method for multipath transmission, according to an embodiment of the invention. In one example, the method of FIG. 6b may be performed by a UE. As illustrated in FIG. 6b, the method may include, at 650, establishing multiple network interfaces for multipath transmissions, where the multiple network interfaces comprise a first radio interface and a second radio interface. The method may then include, at 655, receiving a request from an access-path network to keep flows of the first radio interface and the second radio interface separate. The access-path network may include, for example, a cloud of networks, a core network, a server, and/or a radio access network.

According to some embodiments, the establishing of the multiple network interfaces may include searching for networks and requesting internet protocol (IP) addresses via found networks. In certain embodiments, the establishing of the multiple network interfaces may include opening the multiple interfaces by mapping different ports or port ranges to different network interfaces.

In an embodiment, the method may further include, at 660, selecting, in response to the request, flow routing rules of the first radio interface and the second radio interface. In an embodiment, the method may further include, at 661, deciding to ignore, in response to the request, the flow routing rules of the first radio interface and the second radio interface. The method may then include, at 665, transmitting data using the first radio interface and the second radio interface regardless of the flow routing rules of the first radio interface and the second radio interface.

According to one embodiment, the method may also include receiving a request from the access-path network to open the second radio interface, determining whether the second radio interface can be opened, and transmitting a response to the access-path network depending on the determination. In an embodiment, the UE may be configured by policies that determine whether the user equipment establishes the multiple network interfaces or a single network interface. In some embodiments, the method may include transferring a flow from a less efficient one of the first radio interface or second radio interface to another one of the first radio interface or second radio interface.

Figure 7:
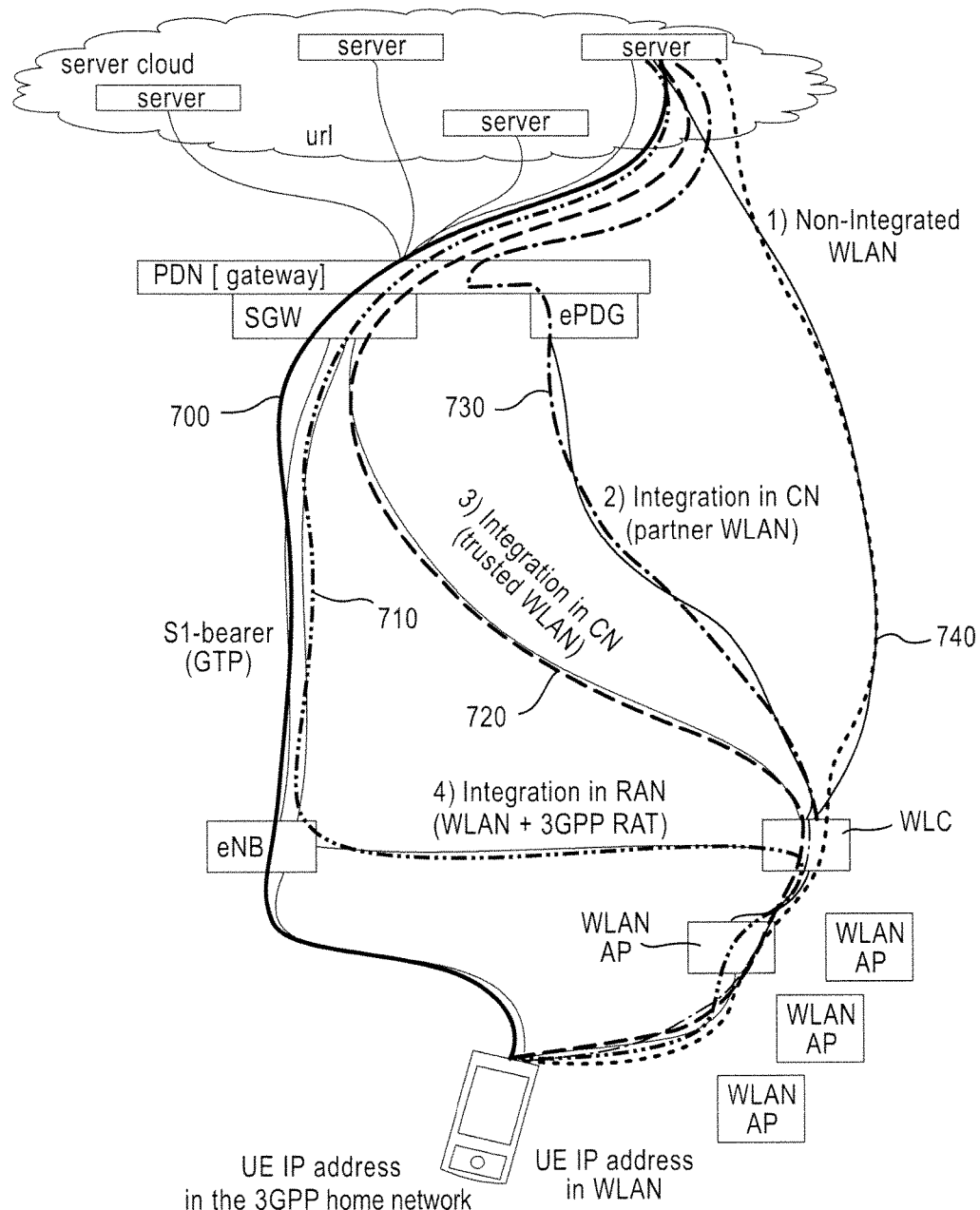
FIG. 7 illustrates example alternatives for integrating the WLAN network to the 3GPP network and running multipath protocols between the UE and the server, according to certain embodiments.

Use of embodiments of the invention in different 3GPP and WLAN network integration alternatives are discussed below in connection with FIGS. 7-12. FIG. 7 illustrates example alternatives for integrating the WLAN network to the 3GPP network and running multipath protocols between the UE and the server. These alternatives include: 1) non-integrated WLAN network, 2) integration of partner (untrusted) WLAN via the ePDG, 3) integration of trusted WLAN to the 3GPP core network (e.g., via s2a, s2b or s2c) or 4) integration of WLAN to the 3GPP network in the RAN. The multipath operation is feasible in all these architectural options, i.e., having the subpath 700 via the 3GPP access and having the subpaths 710, 720, 730, or 740 via the WLAN access.

Figure 8:
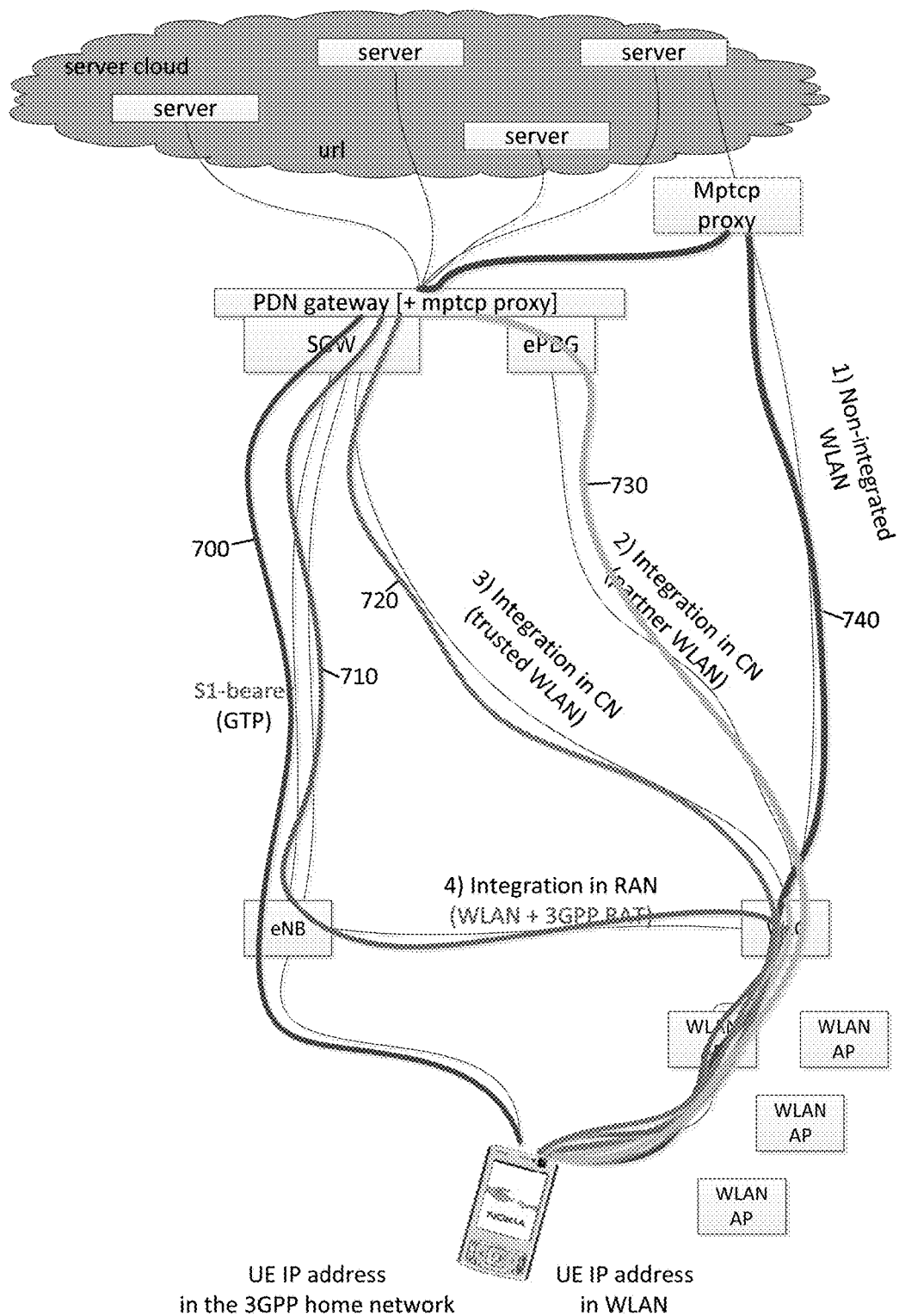
FIG. 8 illustrates example alternatives for running multipath protocols in the architectures of FIG. 7 and having a multipath protocol proxy implemented to the PDN gateway, according to an embodiment.

FIG. 8 illustrates example alternatives for running multipath protocols in the architectures of FIG. 7 and having a multipath protocol proxy implemented to the PDN gateway. The proxy is an on-path proxy for the subpath 700 via the 3GPP access and for the subpaths 710, 720, 730 via the WLAN depending on the network integration. In a non-integrated network architecture, there may yet remain a proxy as an off-path proxy for the subpath 740 outside the access-path network. This kind of proxy could, for example, be configured to the connectivity settings of the device, or to the application settings (e.g., browser) of a device.

Figure 9:
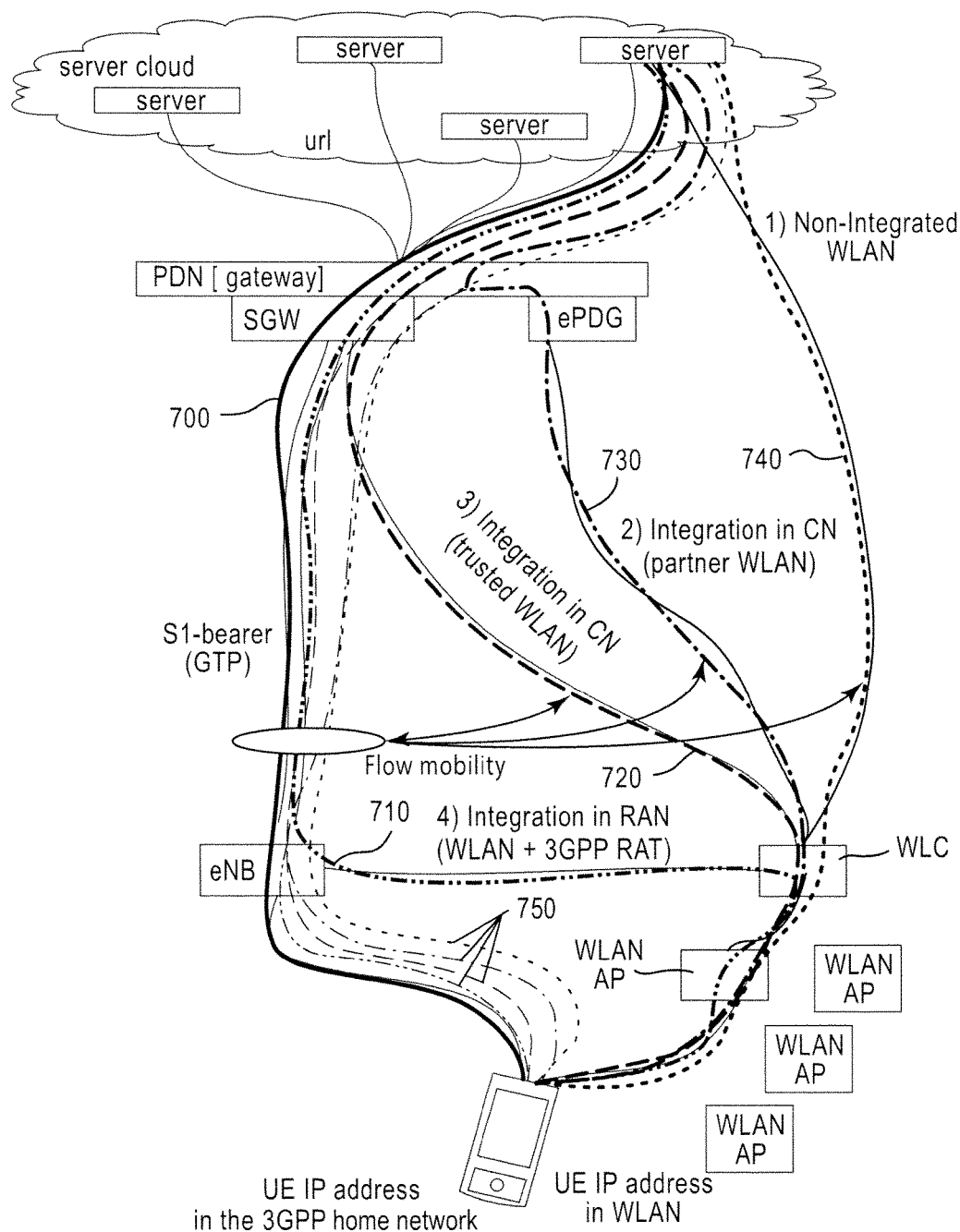
FIG. 9 illustrates an example multipath operation with flow mobility, according to an embodiment.

FIG. 9 illustrates an example multipath operation with flow mobility, according to an embodiment. Flow mobility that is un-aware of the on-going multipath operation may map the flows from one access to another, for example, leading the subpaths 750 (dashed) over the WLAN access to be routed via the 3GPP access 700. This will lead to the lack of transport path diversity, which is the key motivation for the operation of the multipath protocol. Conversely, the flows from the 3GPP access path may be routed to the WLAN access path 710, 720, 730, 740 leading to the lack of transport path diversity as well. According to embodiments of the invention, it is beneficial to force the flows to stay on different access paths, when the multipath protocol operation is expected to be the solution for the mobility, robustness and performance instead of the flow mobility operation trying to solve the same.

Figure 10:
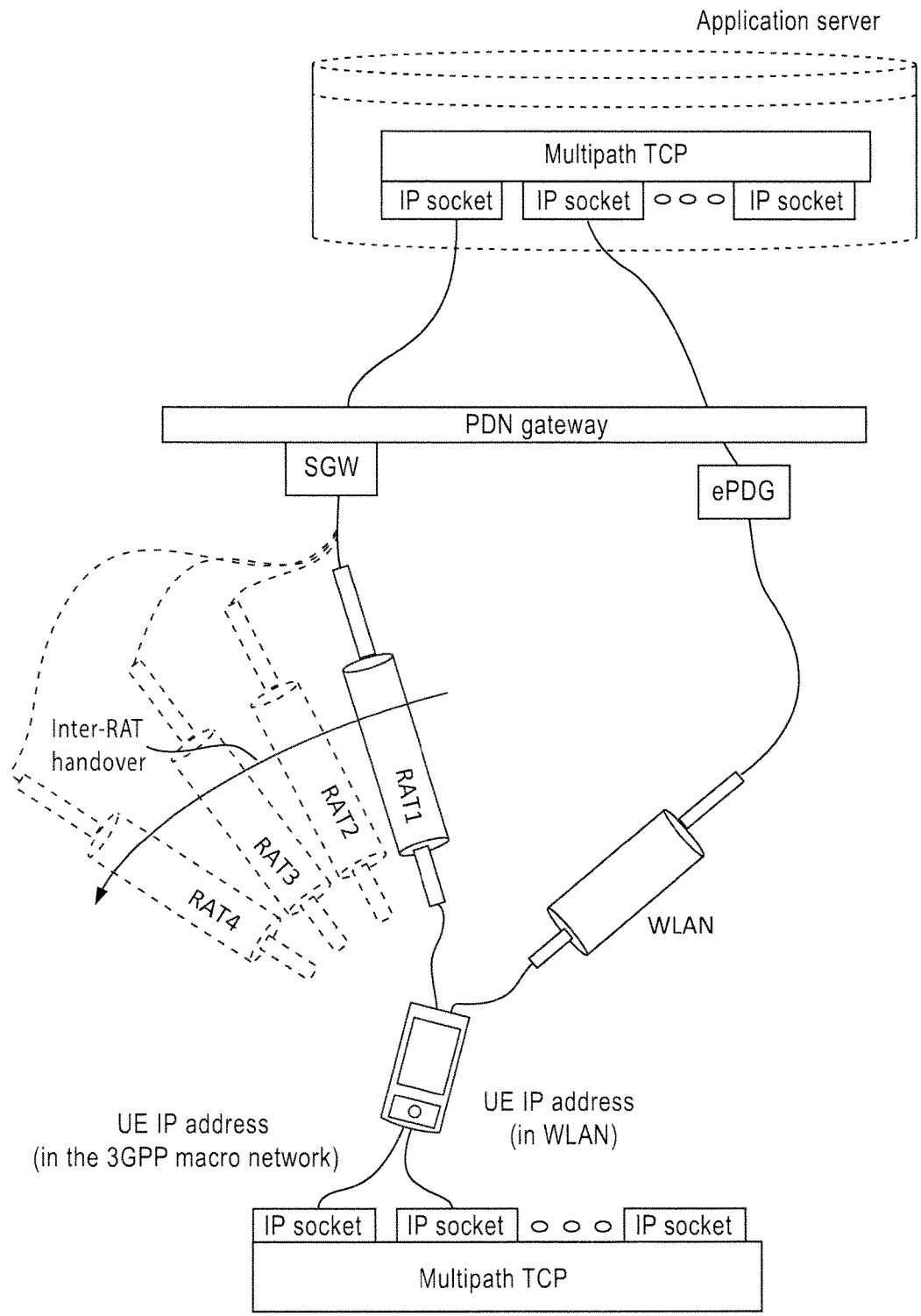
FIG. 10 illustrates an example multipath transmission for a multi-homed case in integration alternative 2.
Figure 11:
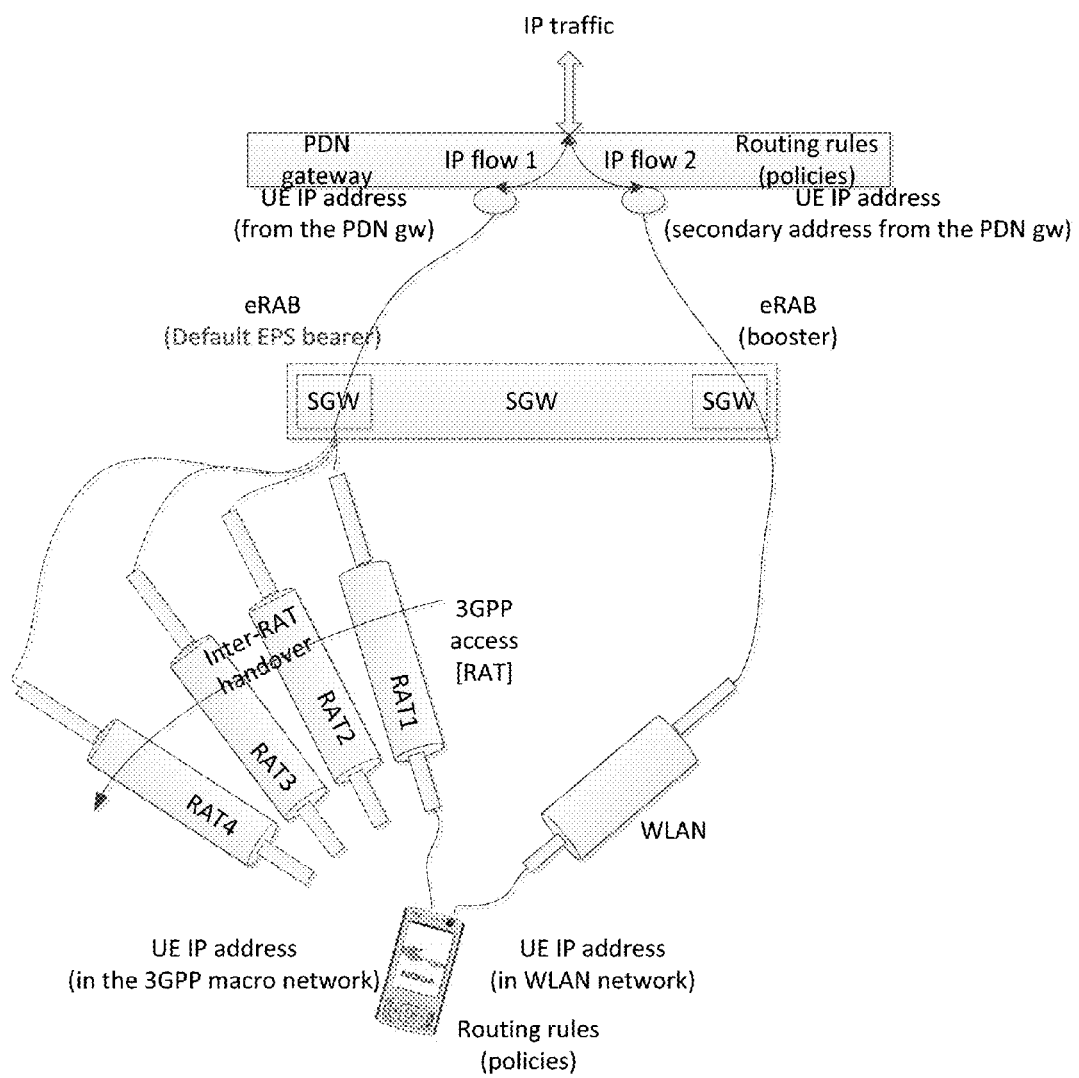
FIG. 11 illustrates an example multipath transmission for a multi-homed case with flow mobility (routing rules) in integration alternative 3.
Figure 12:
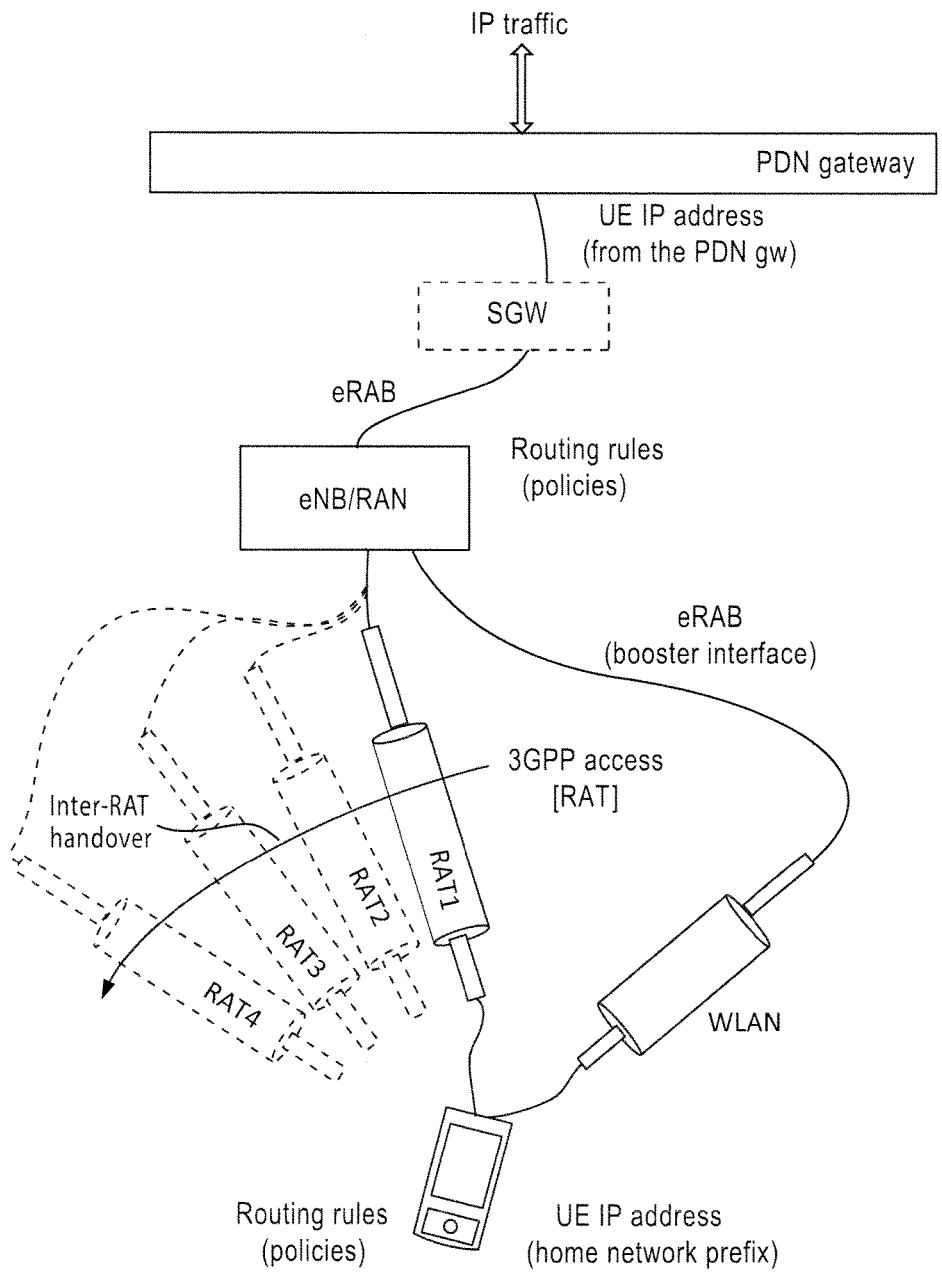
FIG. 12 illustrates an example multipath transmission for a single-homed case in integration alternative 4.

FIG. 10 illustrates an example multipath transmission for a multi-homed case in integration alternative 2; FIG. 11 illustrates an example multipath transmission for a multi-homed case with flow mobility (routing rules) in integration alternative 3; and FIG. 12 illustrates an example multipath transmission for a single-homed case in integration alternative 4.

In view of the above, embodiments of the invention have the benefits of handling the transport flows separately but still being able to utilize one or more radio accesses bound to the interfaces for the multipath transport, yet utilizing joint protocols and joint algorithms. This results in robustness and throughput gains compared to conventional single path transport where the access network in use can only be changed via a system specific (i.e., 3GPP) mobility procedure. Yet embodiments avoid the complexity of providing multiple IP addresses/prefixes and it avoids the complexity of flow switching by network-based flow mobility procedures.

In some embodiments, the functionality of any of the methods described herein, such as those illustrated in FIGS. 6a and 6b discussed above, may be implemented by software and/or computer program code or portions of it stored in memory or other computer readable or tangible media, and executed by a processor. In some embodiments, the apparatuses described herein may be, included or be associated with at least one software application, module, unit or entity configured as arithmetic operation(s), or as a program or portions of it (including an added or updated software routine), executed by at least one operation processor.

Programs, also called program products or computer programs, including software routines, applets and macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality of any method or apparatus described herein may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
    establishing, by a user equipment, multiple network interfaces for concurrent multipath transmissions for a multipath protocol, wherein the multiple interfaces comprise a first radio interface and a second radio interface;
    receiving a request from an access-path network to keep flows of the first radio interface and the second radio interface separate irrespective of flow routing rules of the multiple interfaces, the flow routing rules comprising flow mobility policy;
    deciding to ignore, in response to the request, the flow routing rules of the first radio interface and the second radio interface and deciding by the multipath protocol how to transmit data over the multiple interfaces; and
    transmitting the data, using the multipath protocol, over the first radio interface and the second radio interface regardless of how the flow routing rules of the first radio interface and the second radio interface prescribe the data to be transmitted.

2. The method according to claim 1, further comprising:
    selecting, in response to the request, flow routing rules of the first radio interface and the second radio interface.

3. The method according to claim 1, wherein the establishing comprises searching for networks and requesting internet protocol (IP) addresses via found networks.

4. The method according to claim 1, wherein the establishing further comprises opening the multiple interfaces by mapping different ports or port ranges to different network interfaces.

5. The method according to claim 1, further comprising:
    receiving a request from the access-path network to open the second radio interface;
    determining whether the second radio interface can be opened; and
    transmitting a response to the access-path network depending on the determination.

6. The method according to claim 1, wherein the user equipment is configured by policies that determine whether the user equipment establishes the multiple network interfaces or a single network interface.

7. The method according to claim 1, further comprising transferring a flow from a less efficient one of the first radio interface or second radio interface to another one of the first radio interface or second radio interface.

8. The method according to claim 1, wherein the access-path network comprises at least one of a cloud of networks, a core network, a server, or a radio access network.

9. The method according to claim 1, further comprising receiving a request from the access-path network to trigger use of the multipath protocol between the user equipment and a server in the access-path network.

10. An apparatus, comprising:
    at least one processor; and
    at least one memory including computer program code,
    wherein the at least one memory and the computer program code are configured, with the at least one processor, to cause the apparatus at least to establish multiple network interfaces for concurrent multipath transmissions for a multipath protocol, wherein the multiple interfaces comprise a first radio interface and a second radio interface;

receive a request from an access-path network to keep flows of the first radio interface and the second radio interface separate irrespective of flow routing rules of the multiple interfaces, the flow routing rules comprising flow mobility policy;

decide to ignore, in response to the request, the flow routing rules of the first radio interface and the second radio interface and decide by the multipath protocol how to transmit data over the multiple interfaces; and transmit, using the multipath protocol, the data over the first radio interface and the second radio interface regardless of how the flow routing rules of the first radio interface and the second radio interface prescribe the data to be transmitted.

11. The apparatus according to claim 10, wherein the at least one memory and the computer program code are further configured, with the at least one processor, to cause the apparatus at least to:

select, in response to the request, flow routing rules of the first radio interface and the second radio interface.

12. The apparatus according to claim 10, wherein the at least one memory and the computer program code are further configured, with the at least one processor, to cause the apparatus at least to establish the multiple network interfaces by searching for networks and requesting internet protocol (IP) addresses via found networks.

13. The apparatus according to claim 10, wherein the at least one memory and the computer program code are further configured, with the at least one processor, to cause the apparatus at least to establish the multiple network interfaces by opening the multiple interfaces by mapping different ports or port ranges to different network interfaces.

14. The apparatus according to claim 10, wherein the at least one memory and the computer program code are further configured, with the at least one processor, to cause the apparatus at least to:

receive a request from the access-path network to open the second radio interface;

determine whether the second radio interface can be opened; and transmit a response to the access-path network depending on the determination.

15. The apparatus according to claim 10, wherein the apparatus is configured by policies that determine whether the user equipment establishes the multiple network interfaces or a single network interface.

16. The apparatus according to claim 10, wherein the at least one memory and the computer program code are further configured, with the at least one processor, to cause the apparatus at least to transfer a flow from a less efficient one of the first radio interface or second radio interface to another one of the first radio interface or second radio interface.

17. The apparatus according to claim 10, wherein the access-path network comprises at least one of a cloud of networks, a core network, a server, or a radio access network.

18. The apparatus according to claim 10, wherein the at least one memory and the computer program code are further configured, with the at least one processor, to cause the apparatus at least to:

receive a request from the access-path network to trigger use of the multipath protocol between the apparatus and a server in the access-path network.

19. An apparatus, comprising:

at least one processor; and at least one memory including computer program code, wherein the at least one memory and the computer program code are configured, with the at least one processor, to cause the apparatus at least to transmit a request to a user equipment to keep flows of a first radio interface and a second radio interface separate irrespective of flow routing rules of the first and second radio interfaces, the flow routing rules comprising flow mobility policy, wherein the first radio interface and the second radio interface are for concurrent multipath transmissions for a multipath protocol;
and receive a response from the user equipment of whether or not the second radio interface can be opened.

20. The apparatus according to claim 19, wherein the at least one memory and the computer program code are further configured, with the at least one processor, to cause the apparatus at least to transmit a request to open the second radio interface.

21. The apparatus according to claim 19, wherein the at least one memory and the computer program code are further configured, with the at least one processor, to cause the apparatus at least to receive data using the first radio interface and the second radio interface when the response indicates that the second radio interface can be opened.

22. The apparatus according to claim 19, wherein the at least one memory and the computer program code are further configured, with the at least one processor, to cause the apparatus at least to receive data only using the first radio interface when the response indicates that the second radio interface cannot be opened.

* * * * *